US008764971B2

(12) United States Patent  
Bories et al.

(10) Patent No.: US 8,764,971 B2  
(45) Date of Patent: Jul. 1, 2014

(54) METHOD FOR CATALYTIC CRACKING WITH MAXIMIZATION OF DIESEL BASE STOCKS

(75) Inventors: Marc Bories, St Jouin de Bruneval (FR); Patrick Leroy, Saint Vigor d'Ymonville (FR); Michael Echard, Montivilliers (FR); Thierry Gauthier, Brignais (FR)

(73) Assignee: Total Raffinage Marketing, Puteaux (FR)

( * ) Notice: Subject to any disclaimer, the term of this patent is extended or adjusted under 35 U.S.C. 154(b) by 413 days.

(21) Appl. No.: 12/966,470

(22) Filed: Dec. 13, 2010

(65) Prior Publication Data

US 2011/0139679 A1 Jun. 16, 2011

Related U.S. Application Data (60) Provisional application No. 61/287,858, filed on Dec. 18, 2009.

(30) Foreign Application Priority Data

Dec. 14, 2009 (FR) ...................................... 09 58955

(51) Int. Cl.  
C10G 11/00 (2006.01)

(52) U.S. Cl.  
USPC ................................ 208/113; 208/78; 208/95

(58) Field of Classification Search  
USPC .................................................. 208/78, 113  
See application file for complete search history.

(56) References Cited

U.S. PATENT DOCUMENTS

| 4,417,974 | A | 11/1983 | Haunschild | |
|---|---|---|---|---|
| 5,087,349 | A * | 2/1992 | Goelzer et al. | 208/113 |
| 6,287,522 | B1 * | 9/2001 | Lomas | 422/144 |
| 6,416,656 | B1 * | 7/2002 | Zhang et al. | 208/113 |
| 7,008,527 | B2 | 3/2006 | Gauthier et al. | |
| 2003/0116471 | A1 * | 6/2003 | Zhang et al. | 208/113 |
| 2004/0079679 | A1 | 4/2004 | Gauthier et al. | |
| 2006/0178546 | A1 * | 8/2006 | Mo et al. | 585/648 |

FOREIGN PATENT DOCUMENTS

| EP | 0 180 291 A1 | 5/1986 |
|---|---|---|
| EP | 0 265 347 A1 | 4/1988 |
| EP | 1 413 622 A1 | 4/2004 |
| FR | 2 829 143 A1 | 3/2003 |
| WO | 2006/020547 A1 | 2/2006 |

OTHER PUBLICATIONS

French Search Report—Jul. 8, 2010.

* cited by examiner

Primary Examiner — Randy Boyer  
Assistant Examiner — Juan Valencia  
(74) Attorney, Agent, or Firm — Sughrue Mion, PLLC (57) ABSTRACT

The invention relates to a method for catalytic cracking to maximize the production of diesel base stocks, comprising a cracking reaction step in an upflow fluidized bed reactor (1), a step of separating the cracked hydrocarbons and coked catalyst, a step of fractionating the cracked hydrocarbons and a step of regenerating said coked catalyst, wherein the hydrocarbon feedstock is injected into the upflow reactor on a catalyst partially deactivated by prior coking of at least part thereof in the same upflow reactor, so that the reaction temperature of the effluents leaving said reactor varies from 470 to 600° C.

The invention also relates to a device for implementing the cracking method.

9 Claims, 4 Drawing Sheets

METHOD FOR CATALYTIC CRACKING WITH MAXIMIZATION OF DIESEL BASE STOCKS

The present invention relates to a method for catalytic cracking to maximize the production of diesel base stocks, comprising a cracking reaction step in at least one upflow fluidized bed reactor, a step of separating the cracked hydrocarbons and catalyst, a step of fractionating the cracked hydrocarbons and a step of regenerating the coked catalyst. It also relates to devices for implementing said method, which may comprise one or more upflow reactors.

For several years, refiners and companies offering FCC (Fluidized Catalytic Cracking) technology licenses have been working on optimizing the operation of these methods and of the corresponding units. This optimization was initially focused on the production of light liquefied gas products (or LPG: liquefied petroleum gas), naphthas and gasoline, these products essentially corresponding either to the market for polymers produced by the polymerization of light olefins, or to the majority fuel consumption of the light and heavy motor vehicle fleet. In this type of operation, the production of diesel base stocks remains limited.

Since the automobile market has evolved considerably, and the consumption of diesel type products has substantially increased, it is becoming increasingly necessary to direct the production of the refineries toward the production of diesel base stocks and, above all, to limit the production of gasoline. As often occurs, these refineries are equipped with FCC units, and it is imperative to be able to convert these units into units favoring the production of diesels. The particular feature of FCC processes is to produce simultaneously light liquefied gases, naphthas, gasolines, diesel base stocks called LCOs (light cycle oils), heavier highly aromatic base stocks unusable as such, called HCOs (heavy cycle oils), and hydrocarbon slurry or sludge usable in particular in the composition of road surfacings and more often as base stocks for heavy fuel oil.

In the context of the present invention, the aim is to maximize the production of diesel base stocks in the fluidized bed or FCC catalytic cracking units while limiting the production of gasoline, while maximizing or maintaining the quantity of light gases or LPGs, and limiting the formation of slurry, without drastically changing the arrangement of the existing FCC units. This invention applies to the modernization of existing FCC units or even to new units without significant upheavals in the essential components of the unit.

In the prior art, it is customary to operate these units in maximum gasoline or maximum conversion mode to produce a majority of gasoline from petroleum cuts originating from crude oil distillation, preferably from vacuum distillate and/or atmospheric or vacuum residue, alone or as mixtures, these cuts being optionally hydrotreated.

To increase the quantity and quality of distillate corresponding to a temperature interval of 145 to 400° C. from these same feedstocks in a fluidized bed catalytic cracking unit, it is necessary to lower the conversion level in the unit, the cetane measurement being characteristic of the quality of distillate thus produced. Unfortunately, it is known to a person skilled in the art that lowering the conversion of the catalytic cracking unit inevitably gives rise to the production of large amounts of less usable heavy products, called HCOs (heavy cycle oils) and/or slurry, that is, any molecule typically distilling above 330° C., preferably above 350° C. The HCO cut generally corresponds to an interval from 350 to 450° C., while the slurry corresponds to a cut distilling above 450° C., or 450° C.

To modify the conversion in the reactor accordingly, it is possible to adjust the activity of the catalyst and hence its effectiveness in converting the hydrocarbon feedstock at the catalytic reaction temperature in the upflow reactor (riser). Two alternatives are available to a person skilled in the art:

- either circulate a low activity catalyst having a moderate or low specific surface area, for example lower than 110 $m^2/g$, in the unit, favoring the bottom conversion of the heaviest components of the feedstock and limiting the conversion of the feedstock, but with a yield of dry gases and liquefied gases or LPGs that is too low (typically lower than 15%),
- or modify the active surface area of the catalyst by coking, using a commercial acidic catalyst, for example those used today for maximum gasoline runs, to make it less active before introducing the fresh feedstock into the reactor and thereby limit its conversion.

This second alternative is generally preferred, because the other lower conversion catalysts are not or are no longer available on the market.

In order to modify the activity of the catalyst mass inside the fluidized bed reactor at the feedstock injection point, it has been considered to introduce into the upflow reactor at least one stream of partially coked catalyst, preferably two streams of catalysts at different rates and temperatures, the first essentially formed of regenerated catalyst and the second of coked catalyst. This stream or these two streams constitute(s) a catalytic mass having a controlled activity which, when contacted with the feedstock, allows optimized cracking thereof for a desired distillate selectivity.

For example, U.S. Pat. No. 7,008,527 to IFP describes a staged feed of regenerated catalyst to the upflow reactor by means of a tube arranged coaxially in the bottom of the reactor, the catalyst preserving a standard circulation pattern, as in a conventional FCC unit. A first catalyst introduction zone located at the base of the riser, as in the flowchart of a conventional FCC unit, serves to ensure the production of gasoline and diesel base stocks and also that of the other cuts produced by a conventional FCC unit. A second feed of regenerated catalyst, located higher than the first in the upflow reactor, is contacted with a specific feedstock and, under certain operating conditions, serves to contribute added activity which, depending on said additional specific feedstock, leads to a more complete cracking reaction resulting in an increase of the production of olefins and a decrease of the formation of distillate. The injection of inert fluid serves to cool the reaction under way and, above all, to block the cracking reaction mechanisms while favoring the production of propylene.

U.S. Pat. No. 4,417,974 to Chevron proposes a method for cracking catalyst deactivation compounds by using a tube located inside the riser arranged substantially coaxially thereto. This tube is co-fed with part of the regenerated catalyst and a hydrocarbon feedstock in gentle cracking conditions, because the temperature inside the central tube is between 400 and 500° C., thereby limiting the coking of the catalyst. The other part of the catalyst that flows outside the coaxial tube is contacted with the main feedstock containing added catalyst deactivation compounds, injected at the riser wall. The streams of catalyst having the same density issuing from the central tube and from the annular portion meet at a relatively high level of the upflow reactor. The catalyst deactivation compounds consist of hydrocarbon fractions having a boiling point higher than 600° C. and already cracked hydrocarbon recycles, these compounds being highly concentrated with asphaltenes and with nitrogen and sulfur compounds.

Patent EP0180291 to Mobil describes a method which consists in separating the freshly regenerated catalyst in two successive cavities at the bottom of the upflow reactor. The first zone, having a venturi shape, allows the contacting of the feedstock with part of the freshly regenerated catalyst, this first zone also favoring the acceleration of the catalyst and of the vaporized oil in the rector. The other part of the regenerated catalyst is then segregated outside the venturi. In the first zone, partial deactivation of the catalyst and vaporization of oil occur, following injection of the feedstock into that zone. Upon leaving the venturi, the vaporized oil and the partially deactivated catalyst come into contact again with the still very hot and active catalyst of the second zone, and the cracking reaction continues. The object here is to minimize local superheating, which generates coke by overcracking, by incremental vaporization of the feedstock in order to promote the production of light products such as gasolines and lighter products, dry gases and LPGs.

Patent FR 2829143 to China Petroleum describes a catalytic cracking method capable of simultaneously treating heavy oils and light oils by introducing these two feedstocks into two distinct but concentric cavities filled with the same regenerated catalyst, the reactor having the shape of a double tube. As in the preceding patents, the object is to maximize the production of gasoline cuts.

Contrary to the methods and devices described above, it is the object of the present invention to maximize the formation of diesel base stocks in order to meet new market demand for diesel type products while minimizing the production of gasoline base stocks. Furthermore, the aim is not to change the configuration of the existing reactors but to change their operating mode by minor modifications, a return to maximum gasoline production being feasible at any time. Moreover, the operation intended to maximize the diesel base stocks, or middle distillates, must not be detrimental to the production of light cuts such as liquefied gases, while limiting the production of gasoline as much as possible.

The present invention therefore relates to a method for catalytic cracking to maximize the production of diesel base stocks, comprising a cracking reaction step in an upflow fluidized bed reactor, a step of separating the cracked hydrocarbons and coked catalyst, a step of fractionating the cracked hydrocarbons and a step of regenerating said coked catalyst, wherein the hydrocarbon feedstock is injected into the upflow reactor on a catalytic mass consisting of catalyst partially deactivated by coking of at least part thereof in the same upflow reactor, so that the reaction temperature (or TRX) of the effluents leaving said reactor varies from 470 to 600° C. This coking can be carried out before or immediately after injecting the feedstock.

In the context of the present invention, separation step occurring in a separator means a step which serves simultaneously or successively to separate the gaseous cracking effluents from the catalyst grains and/or fines, and stripping the catalyst. When the catalyst is stripped, the light fractions still present on or in the catalyst are displaced, for example under the action of steam.

A first advantage of the present invention is its applicability to existing units, involving limited modifications thereof, while using the catalysts available on the market, generally highly active and maximizing the production of gasoline.

A second advantage is its reversibility: since the same unit and the same catalyst are used, it is always possible to reverse the changes and again maximize the gasoline if the market trend has been reversed. Acid catalysts with microporous and mesoporous pores can then be used, for which the ratio of microporous specific surface versus mesoporous specific surface is from 1 to 6, preferably from 1 to 4, most preferably from 3 to 4.

Specific surface may be measured using the BET method (for Brunauer Emmet et Teller).

A third advantage is that the production of dry gases and liquefied gases is maintained, particularly that of propylene.

A fourth advantage is the possible depletion of the compounds having a boiling point higher than 350° C., that is the depletion of the HCO and slurry.

A fifth advantage is that the thermal equilibrium of the unit is preserved, despite the low reaction temperatures, typically between 470 and 515° C. In comparison, in maximum gasoline production mode, the reaction temperature is seldom lower than 525° C. for a given acidic catalyst. However, if very low activity catalysts are used, the reaction temperature required would be closer to 600° C. than to 490° C.

To reach this reaction temperature, a first means according to the present invention is to inject at least one hydrocarbon compound having a boiling point equal to or higher than 350° C., on at least part of the regenerated catalyst, this part being bounded by at least one zone defined by means of an internal device. Among the hydrocarbon compounds, HCO and/or slurry produced by the cracking reaction are recovered in the fractionation step in order to coke at least part of the regenerated catalyst, in at least one of the zones bounded by means of said internal device at the bottom of the upflow reactor of the reaction step. The prior coking of part of the catalyst followed by the mixing thereof with regenerated catalyst thereby serves to control the residual carbon content on the catalyst mass or CRC (Carbon on Regenerated Catalyst), hence its activity and, finally, the conversion rate of the hydrocarbon feedstock injected into the upflow reactor.

It would remain within the scope of the present invention if this pre-coking of the catalyst were to be carried out using a standard hydrocarbon feedstock, for example the same as that injected on the partially coked catalyst mass.

In a preferred embodiment, the HCO recycle is particularly desired not only to limit the conversion of the catalyst by pre-coking, but also because it has better quality and has a higher cracking potential. This is because the HCO resulting from a low conversion cracking contains a high LCO potential of about 15 to 40%, preferably 20 to 30% by weight, and a larger volume thereof is produced.

The use of an internal device already employed serves to bound zones in which different hydrocarbons can be converted under severe but controlled conditions. For example, regenerated market catalysts can be used, at reaction temperatures higher than 525° C., and in a C/O ratio (weight ratio of catalyst to oil or Cat-to-Oil ratio) ranging from 5 to 20, or even higher. These severe conditions favor the coking of HCO and/or slurry type feedstocks on the catalyst, since the coke partly covers the active sites of the catalyst and thereby decreases its activity in a controlled manner. The adjustment of the respective amounts of coked catalysts and catalyst issuing from a second zone bounded by the internal device before injection of the hydrocarbon feedstock into the upflow reactor serves to make the cracking conditions milder while maximizing the production of distillates, chiefly of LCO. This adjustment of the quantities of coked and uncoked catalytic grains is intended to obtain an average residual carbon coefficient (or CRC) of 0.2 to 0.7 on all the grains of the catalyst mass encountering the feedstock. The type of cracked feedstock is standard and generally consists of vacuum residues (RSVs), atmospheric distillates (RATs) from crude oil and/or vacuum gas-oil (VGO). It may also comprise any hydrocarbon derivative produced by the conversion of crude oil and/or any biomass derivative.

Another means for obtaining an average CRC coefficient similar to the above is to return part of the coked catalyst separated and then stripped during the separation step, to the upflow reactor, upstream, at and/or downstream of the hydrocarbon feedstock injection point, at a temperature equal to or lower than the reaction temperature.

In the configuration in which hydrocarbon recycle has a boiling point above 350° C., the controlled coking of the catalyst is obtained by adjusting the recycle rate, the composition of this recycle and/or the operating conditions C/O and TRX.

In this embodiment of the invention, the presence of coked catalyst serves to decrease the activity of the catalyst at the feedstock injection point by the effect of diluting the catalyst already present in the reactor.

Upstream, or at the injection point of the hydrocarbon feedstock to be cracked, this recycle allows the pre-coking of part of the catalyst. Downstream, preferably close to the feedstock injection point, it allows a better vaporization of the feedstock by increasing the mixing temperature of the catalyst and feedstock at the injection point; this is the solid MTC (mixed temperature control) effect.

It would remain within the scope of the invention if this catalyst recycle were to be combined with a plurality of injections of different hydrocarbon cuts along the upflow reactor upstream of the feedstock injection point, downstream or upstream of this recycle.

The coked catalyst can be recycled either by external recycling, or by internal recycling. External recycling consists in circulating the coked catalyst from the separator outside the upflow reactor into which it is reinjected. Internal recycling takes place by internal reflux of the coked catalyst in the upflow reactor, the coked catalyst being injected without circulating coked catalyst outside said reactor. In both cases, the recycle favors the bottom conversion by increasing the C/O and the vaporization of the feedstock if placed downstream thereof. It ensures some pre-coking of the catalyst at the reactor wall, the cracked hydrocarbons being accelerated at the center of the reactor. To further promote the MTC effect, the temperature of the catalyst recycled must be lowered by placing a cooler on the external recycle and/or injecting a gasoline type liquid at the stripping of the coked catalyst. The latter alternative also applies to the internal recycle.

Another embodiment of the invention is to combine the effects of these two actions. Thus, part of the regenerated catalyst is coked upstream of the feedstock injection point by at least one hydrocarbon compound having a boiling point equal to or higher than 350° C., optionally in the presence of an internal device, and part of the coked and stripped catalyst, recovered in the separator, is sent upstream, at and/or downstream of the feedstock injection point in the upflow reactor. It would remain within the scope of the invention if several cuts of different types were to be injected upstream of the feedstock.

It will be easy for a person skilled in the art, by carefully adjusting the operating conditions, reaction temperature, catalyst circulation or even partial pressure of the hydrocarbons injected or recycled into the upflow reactor, to maximize the production of distillate. He will be able to adjust the coking of the catalyst by controlling the flow rate of the hydrocarbon compound and the quantity of recycled coked catalyst in order to adjust the feedstock cracking conditions in the upflow reactor. Typically, the target cracking conditions correspond to an average CRC between 0.2 and 0.7, and a C/O lower than 5, preferably about 4.

In a preferred embodiment, 1 to 100% of the 350° C. or higher distillation cut hydrocarbons, typically the HCO and slurry cuts recovered at the outlet of the fractionation step, is recycled on 1 to 100% by weight of regenerated catalyst introduced at the bottom of the upflow reactor. It would remain within the scope of the invention if the fresh feedstock were itself used.

In another embodiment of the invention, which can be combined with the previous one, 1 to 75% by weight of the coked and stripped catalyst recovered in the separation step is recycled to the upflow reactor upstream, at and/or downstream of the feedstock injection point.

To maintain or even increase the yield of liquefied gases and dry gases, at least one cut having a boiling point lower than 160° C. is injected on regenerated catalyst in the upflow reactor upstream of the feedstock injection point. Preferably, these recycles composed of light gasolines or LCNs (light cracked naphthas) are injected into the part of the upflow reactor where the cracking conditions are the most severe. Typically, the reaction temperature there is much higher than 525° C. and the C/O ratio is much higher than the C/O ratios normally used to maximize the conversion of these cuts without significantly deteriorating the activity of the catalyst, since they produce little coke.

To increase the cracking capacity of the inventive method and, above all, to optimally control the cracking of the feedstock, the inventive method comprises an additional cracking reaction step in an upflow reactor, operating in parallel to the first reaction step. In this second upflow reactor, hydrocarbon cuts having a boiling point equal to or lower than 160° C., preferably lower than 145° C., and/or hydrocarbon cuts having a boiling point equal to or higher than 330° C., preferably higher than 350° C., are recycled on regenerated catalyst originating from the regenerator. These hydrocarbon cuts are selected from the cuts produced by the fractionation of the catalytic cracking unit itself, and from crude oil conversion and/or distillation units, including cuts derived from biomass. Preferably, some of these cuts, recovered in the fractionation step following the first feedstock cracking step, and which have little use or are undesirable, are recycled and injected into the upflow reactor of the second reaction step. The cracking conditions of these hydrocarbon cuts are variable according to the types of hydrocarbon compound recycled: the C/O ratios may range from 4 to 20 and even above, and the reaction temperatures from 470 to 650° C.

A further object of the present invention is the device for implementing the method, comprising at least one upflow reactor equipped with an internal device placed at the bottom of the reactor close to the regenerated catalyst inlet, a separator of the cracking effluents and coked catalyst, a regenerator and a fractionation device, these various devices being connected to allow for the circulation of the fluids and/or of the catalyst between them, which comprises lines for recycling hydrocarbon cuts having a boiling point equal to or lower than 160° C. and/or hydrocarbon cuts having a boiling point equal to or higher than 350° C. to the upflow reactor at the internal device, and/or means for recycling the coked catalyst present in the separator, to the upflow reactor.

The internal device may be disposed upstream of the feedstock injector inside said reactor.

In one embodiment, the device according to the invention can comprise lines for recycling hydrocarbon cuts having a boiling point equal to or higher than 350° C. to the upflow reactor at the internal device, disposed upstream from the feedstock injector inside said reactor, and/or means for recycling the coked catalyst present in the separator, to the upflow reactor.

In another embodiment, the device according to the invention can comprise lines for recycling to the upflow reactor hydrocarbon cuts having a boiling point equal to or higher than 350° C. and lines for recycling hydrocarbon cuts having a boiling point equal to or lower than 160° C. at the internal device, disposed upstream from the feedstock injector inside said reactor, and/or means for recycling the coked catalyst present in the separator, to the upflow reactor.

In still another embodiment, the device according to the invention can comprise lines for recycling to the upflow reactor hydrocarbon cuts having a boiling point equal to or higher than 350° C. and lines for recycling to the upflow reactor hydrocarbon cuts having a boiling point equal to or lower than 160° C., at the internal device, disposed upstream from the feedstock injector inside said reactor, and/or means for recycling the coked catalyst present in the separator, to the upflow reactor.

In a first embodiment, the internal device is positioned in the upflow reactor so as to define a compartment (X) whereof the cross section varies from 10 to 90% of that of the upflow reactor, for a length varying from 0.5 m to half of the height of said upflow reactor.

Preferably, the internal device consists of a tube placed coaxially with the upflow reactor and/or at least one separation plate fixed in the upflow reactor parallel to the axis thereof, preferably two parallel and/or intersecting plates.

In one embodiment of the inventive device, the recycle line or lines of the hydrocarbon cuts having a boiling point equal to or lower than 160° C. and/or hydrocarbon cuts having a boiling point equal to or higher than 350° C. terminate(s) at the base of the upflow reactor, inside or outside said compartment (X).

According to another embodiment, the device comprises means for internal or external recycling of the catalyst coked and stripped in the separator to the upflow reactor. A first recycle means is an external line for recycling coked and stripped catalyst from the separator to the upflow reactor. This recycle line arrives upstream, at and/or downstream of the feedstock injector in the upflow reactor, this line being optionally equipped with a cooler (catcooler). It would remain within the scope of the invention if were substituted for this cooler, or if were added, a catalyst quench device by means of one or more hydrocarbon liquids.

A second means for recycling coked and stripped catalyst is to use an upflow reactor whereof the upper end walls comprise at least one opening (20) having an optionally variable size, for example by using plug valves or any other system. These openings serve to send grains of said coked and stripped catalyst from the dense bed of said separator directly into the upflow reactor, since at this level the pressure in the separator is higher than the pressure at the top of the reactor.

According to a supplementary embodiment of the invention, the device comprises a second reactor placed parallel to the first upflow reactor, connected to the regenerator by its lower portion via a first line and to the separator by its upper portion via the second line. This second reactor comprises distillate injection lines, placed along said reactor in an optionally staged manner. As a reminder, these distillates are chiefly low boiling point hydrocarbon cuts and high boiling point distillates, for example recycles of undesired hydrocarbon cuts, obtained in the fractionation unit.

To facilitate an understanding of the various elements required for the satisfactory operation of the inventive device, FIGS. 1 to 6 are provided, but cannot constitute a limiting view thereof.

Figure 1:
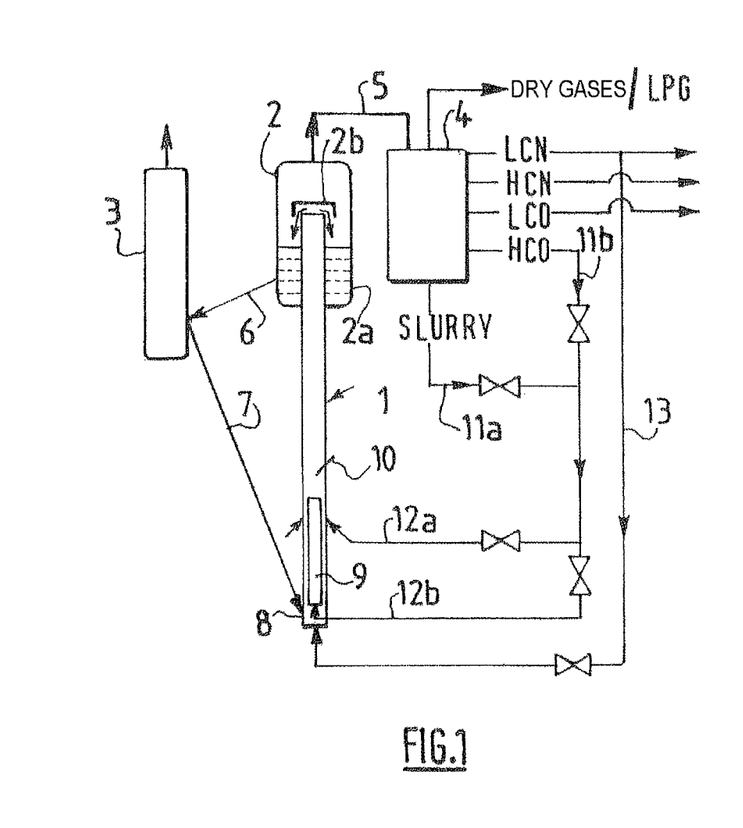
FIG. 1 is a diagram of a unit comprising an upflow reactor comprising a heavy hydrocarbon recycle having a temperature above 350° C. of the HCO and/or slurry type.

In FIG. 1, the inventive device is a schematic FCC unit comprising an upflow reactor (1), a separator (2) of the cracking products and the coked catalyst, comprising a stripper (2a) and a gas/solid separator (2b), a regenerator (3) and a fractionation unit (4) fed via a line (5) with fluids from the separator (2). The coked catalyst from the separator (2) is sent to the regenerator (3) via the line (6) and the regenerated catalyst leaving the regenerator (3) is sent via the line (7) to the bottom of the upflow reactor (1). An internal device in the form of a coaxial tube (9) is placed at the bottom of the reactor (1) close to the inlet (8) via the line (7) of the regenerated catalyst in the reactor (1), this tube (9) serving to segregate two distinct catalyst streams, the inner stream in the tube (9) and the annular stream between the outside wall of the tube (9) and the inside wall of the reactor (1). The feedstock injection level in the reactor (1) is referenced (10) above the tube (9).

At the outlet of the fractionation unit (4) are shown the lines for drawing off the various cracking effluents, the heavy HCO and slurry effluents being transferred alone or in a mixture via the lines (11b) and (11a) and the lines (12b) and (12a) respectively inside the tube (9) or in the annular portion between the tube (9) and the inside wall of the reactor (1). Part of the light gasoline or LCN issuing from the fractionating unit (4) is recycled via the line (13) to the bottom of the reactor (1) at the level of the steam injector allowing the catalyst to rise in the reactor (1) but not shown in FIG. 1.

Preferably, the heavy HCO type effluents are recycled in the annular cavity via the line (12a) and the light cuts inside the tube (9) via the line (12b), and the feedstock is injected at the periphery of the tube (9) and above it.

Figure 2:
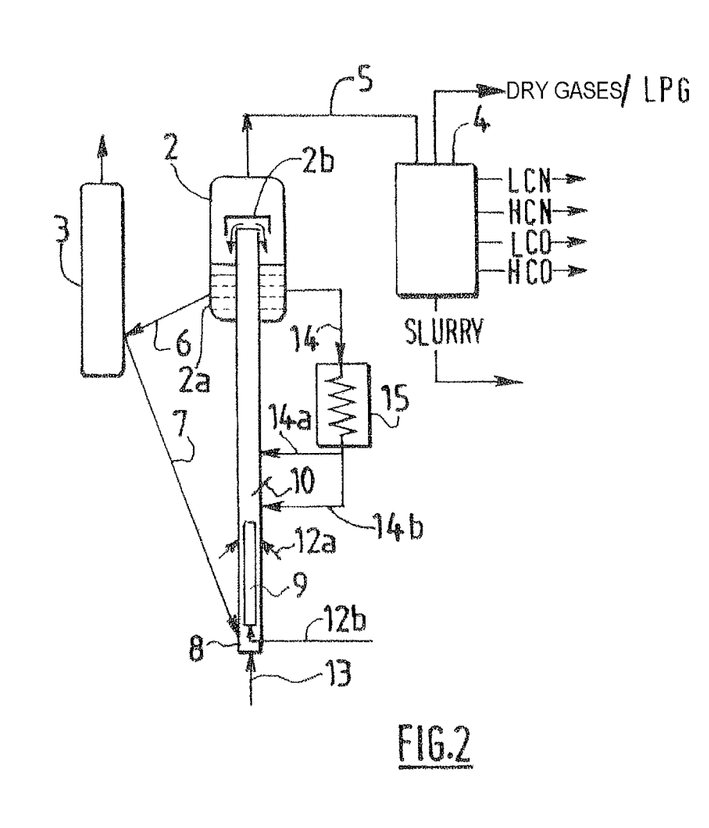
FIG. 2 is a diagram of a unit comprising an external recycle of part of the coked and stripped catalyst, from the separation vessel to the upflow reactor, the positioning of a recycle of heavy products of the HCO and/or slurry type being optional.

FIG. 2 mainly shows the external recycling of the coked catalyst from the separator (2) to the reactor (1) via a line (14) on which a cooler (15) may optionally be installed, and the cooled catalyst may be reintroduced via the lines (14a) and (14b) either downstream, or level with (not shown) or upstream of the feedstock injector (10). FIG. 2 suggests that the recycling of heavy and light products is feasible simultaneously with the external recycling of coked catalyst to the reactor (1).

Figure 3:
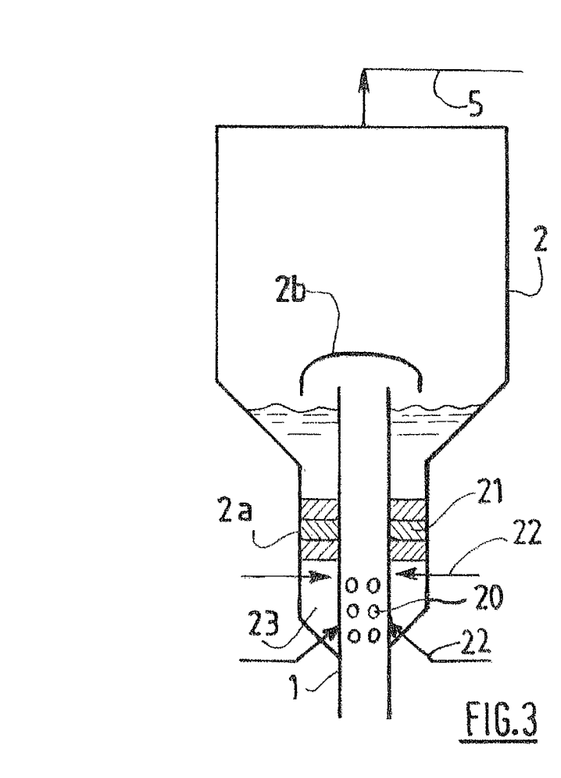
FIG. 3 is a diagram of a unit comprising an internal recycle of part of the coked catalyst, from the separation vessel to the upflow reactor, the positioning of a recycle of heavy products of the HCO and/or slurry type being optional.

FIG. 3 shows a device for the internal recirculation of the coked and stripped catalyst or internal recycle, from the separator (2), to the upper portion of the reactor (1). Here, part of the reactor (1) is placed inside the separator (2), centered on or off-centered from the axis thereof. In the portion of the reactor (1) that is completely immersed in the dense bed of coked and stripped catalyst (23), that is stripped of gaseous hydrocarbon effluents, at the base of the separator (2), one or more openings (20) are provided in the upper end walls of the reactor (1). These openings are sufficiently large to allow the grains of coked and stripped catalyst to pass into the reactor (1). These openings (20) are preferably located above the stripping and/or fluidization injectors (not shown) of the coked catalyst in the separator (2), generally in the form of a ring used to distribute steam or light hydrocarbons in the coked catalyst bed to entrain and separate, from the grains, the cracked hydrocarbons still trapped on the coked grains, and also to lower their temperature. Since the catalyst bed is well fluidized at this level, catalyst grains which are completely stripped of hydrocarbon effluents can easily be returned to the reactor via these openings, the pressure in the separator at this level being higher than that of the upflow reactor at the openings.

To facilitate this step, a specific packing or particle and vaporized effluent divider device (21), surrounding the end of the top of the reactor (1) may be added above the steam or effluent injectors (22).

The orifice or orifices (20) may have a fixed size or a variable opening, controlled for example by one or more valves, for example of the plug valve type, with an actuator outside the separator (2) not shown, in order to adjust the C/O and the CRC of the catalyst circulating in the reactor (1).

Figure 4:
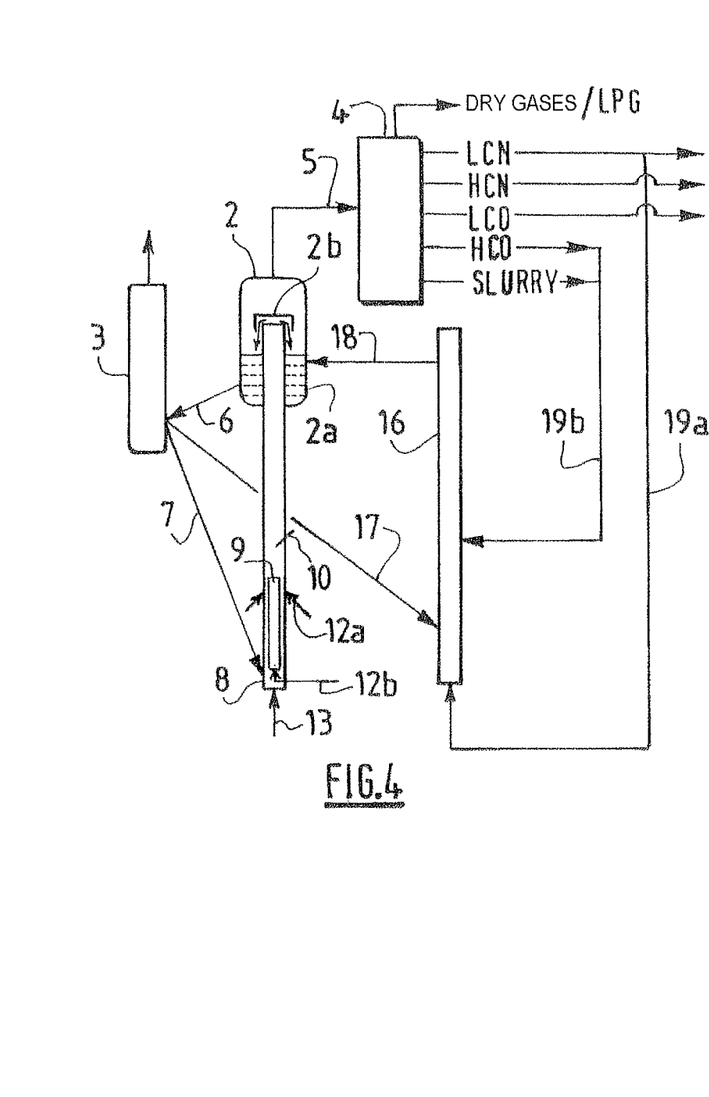
FIG. 4 is a diagram of a unit comprising a second upflow reactor parallel to the first reactor with positioning of the recycles of light products of the light gasoline (LCN) type and of heavy products of the HCO and/or slurry type.

FIG. 4 shows a device such as described in the preceding figures, in which a second upflow reactor is added (16) receiving regenerated catalyst from the regenerator (3) via the line (17), and whereof the coked catalyst at the top of the reactor (16) is conveyed via the line (18) directly into the separator (2). Recycles of part of the light and heavy effluents at the fractionation outlet (4) are conveyed into the reactor (16) via the lines (19a) and (19b) respectively.

Figure 5A:
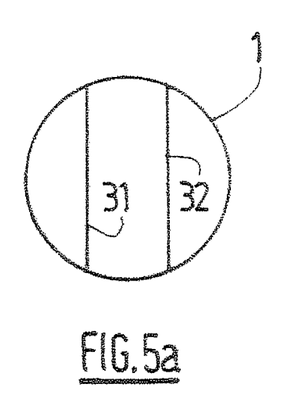
FIGS. 5a to 5d show a cross section of various internal devices suitable for bounding one or more distinct zones into which one or more hydrocarbon cuts could be injected upstream of the injection of the fresh feedstock.
Figure 5B:
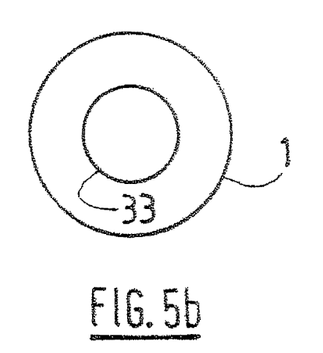
Figure 5C:
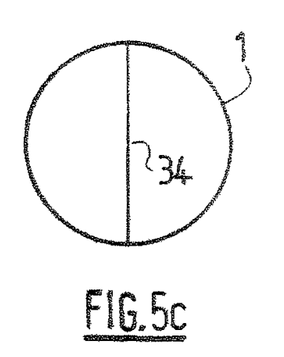
Figure 5D:
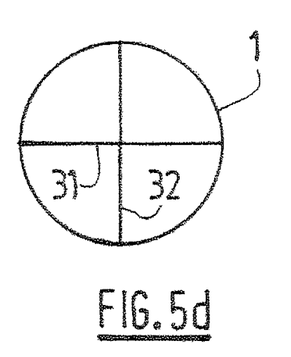

In the light of these various figures, a preferred embodiment of the inventive device is the use of an internal device, for example in the form of a tube (9) placed coaxially with the upflow reactor (1). However, other exemplary configurations of internal devices according to the invention are shown in FIGS. 5a to 5d. These include, for example, a device formed of two plates (31, 32) parallel to one another, positioned asymmetrically about the axis of the reactor (1) and parallel thereto (FIG. 5a), a tube (33) concentric with the reactor (1) (FIG. 5b), a single plate (34) centered on the axis of the reactor (1) and parallel thereto (FIG. 5c) or even two plates (31, 32) parallel to the axis of the reactor and intersecting (FIG. 5d). These devices are intended to create one or more compartments (X) here (9) having a cross section corresponding to 10 to 90% of the cross section of the upflow reactor (1) and having a length of between 0.5 m and half of the height of said upflow reactor (1). If the device is an internal tube, the heavy effluent recycle line terminates at the base, inside said tube (9) or in the annular space bounded by the reactor (1) and the exterior of said tube (9). It should be understood that it is possible to recycle a plurality of hydrocarbon cuts, for example the light effluents in the various sections defined by the device selected, for example one per section.

To maintain or even increase the production of dry gases and LPG, or even to limit the production of heavy effluents, HCO and slurry, it is advantageous to add a second reactor (16) to the unit as shown in FIG. 1, 2 or 3, placed in parallel with the first reactor (1) connected to the regenerator (3) by its lower portion via the line (17) and to the separator (2) by its upper portion via the line (18) and comprising inlet lines for the recycled distillates (19a, 19b), these lines being arranged along said reactor, the recycle lines for the low boiling point distillates being placed upstream of the recycle lines for the high boiling point distillates.

Figure 6:
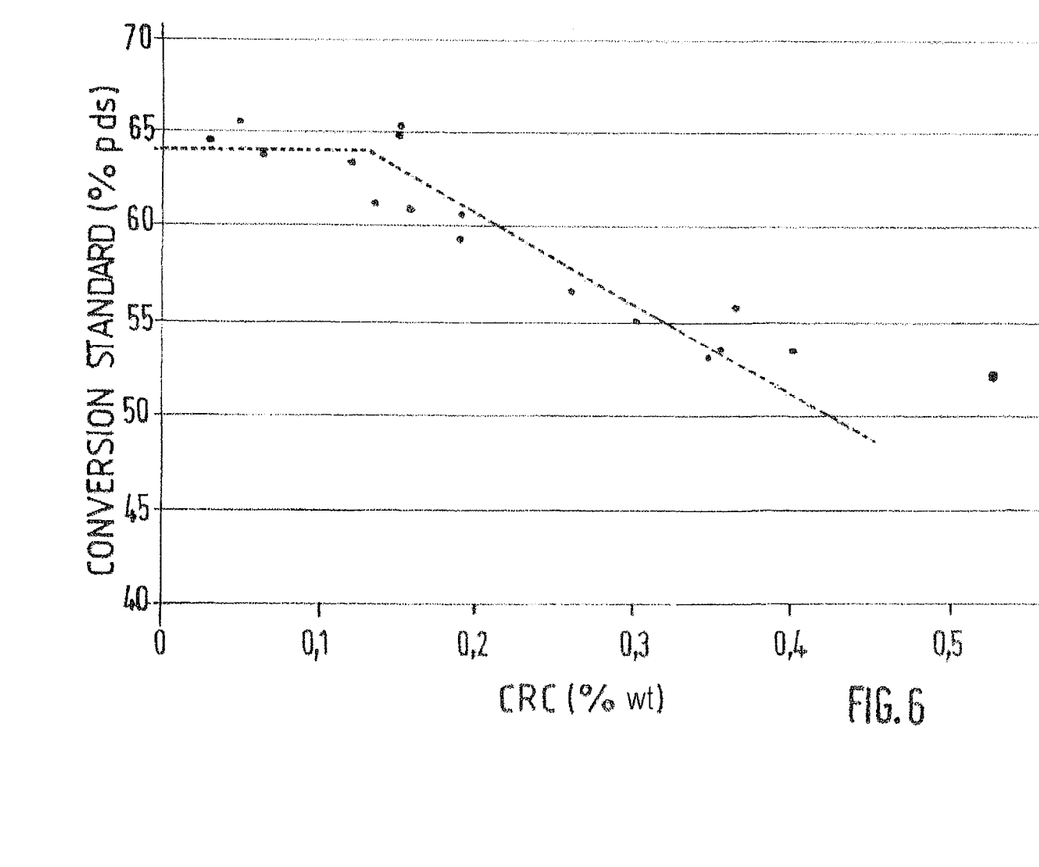
FIG. 6 clearly shows the impact of the carbon still present on the catalyst on its catalytic activity. The invention proposed here is based on these observations, demonstrating a drop in catalytic activity associated with the presence of residual carbon.

FIG. 6 shows the effect of increasing the CRC in weight % on the level of conversion of the feedstock in the reactor under iso-operating conditions. This effect is obtained in the context of the invention by the presence of the coked catalyst in the reactor at the feedstock injection level.

Examples are given in the rest of the present description for the purpose of illustrating the effectiveness of the modifications proposed to convert a FCC unit designed essentially to produce gasoline into a unit essentially producing diesel base stocks.

EXAMPLE 1

This example shows the comparative results obtained between the conventional catalytic cracking unit operating in maximum gasoline mode and the catalytic cracking or FCC unit modified according to the invention, operating in maximum distillate mode with one or two upflow reactors.

This corresponds to a modification of an existing FCC unit treating a previously hydrotreated vacuum distillate feedstock and using a classical acid catalyst, the Conquest from Albemarle, for which the ratio of microporous specific surface to mesoporous specific surface is equal to 2.

To increase the production of distillate while minimizing that of light gasoline, we have changed the operating conditions of the FCC, and the cutting points of the effluents produced in primary fractionation. The catalyst is unchanged regardless of the configuration of the unit and the operating conditions. Two operations of the unit have been proposed with configurations corresponding to the features of the invention (X1 and X2).

A first configuration X1 was made with a single reactor of the type in FIGS. 1 and 2.

A second configuration X2 comprises a second upflow reactor, suitable for reaching the maximum distillate production as shown in FIG. 4. For this case, in which the changes to be made to the catalytic cracking unit are more extensive, it will be necessary to adapt/modify the fractionation (4) and the post-treatment units located downstream of the FCC unit.

Two comparative tests were also performed on a base case giving priority to maximum gasoline (E1) operation of the unit, and on an operation (D1) of the unit in which distillate production is given priority without changing the configuration (mainly via the lowering of the reaction temperature).

The results and operating conditions of the units are given in Tables I and II below. In these tables, the "base" values are reference values against which the gain of the invention is compared.

TABLE I

|  |  | E1 | D1 | X1 | X2 |
|---|---|---|---|---|---|
| Feedstock | t/h | Base | Base | Base | Base |
|  | Final distillation point of cut | | | | |
| Final point: LCN | ° C. | 157 | 153 | 145 | 145 |
| Final point: HCN | ° C. | 218 | 214 | 210 | 210 |
| Final point: LCO | ° C. | 299 | 303 | 400 | 395 |
| Final point: HCO | ° C. | 398 | 415 | 455 | 460 |
| Initial point: slurry | ° C. | 398+ | 415+ | 455+ | 460+ |

TABLE I-continued

|  |  | E1 | D1 | X1 | X2 |
|---|---|---|---|---|---|
| RECYCLES | | | | | |
| Position |  | No | No | Main reactor | 2$^{nd}$ reactor dedicated |
| Total recycle flow rate | t/h |  |  | 50 | 120 |
| Type |  |  |  | LCN + HCO | LCN + HCO |
| OPERATING CONDITIONS | | | | | |
| C/O main reactor | — | 6.5 | 5.7 | 5.8 | 5.7 |
| TRX | °C. | Base | Base-23 | Base-27 | Base-27 |
| T° C./dense phase (= T_ReG) | °C. | 715 | 706 | 692 | 697 |
| O$_2$ enrichment | Nm$^3$/h | 0 | 0 | 1500 | 9000 |
| Wet air blowing | t/h | Base | Base + 7 | Base + 7 | Base + 7 |
| Second reactor C/O | — | na | na | na | 15 |
| TRX second reactor | °C. |  |  |  | 614 |
| Feedstock of main reactor | t/h | Base | Base | Base + 50 | Base + 120 | na: not applicable

TABLE II

|  |  | E1 | D1 | X1 | X2 |
|---|---|---|---|---|---|
| Product yields from unit | | | | | |
| Dry gases | % | 3.0% | 2.5% | 2.5% | 3.2% |
| C3 | % | 8.0% | 7.0% | 8.0% | 7.5% |
| C4 | % | 14.0% | 11.0% | 13.0% | 11.8% |
| LPG | % | 22.0% | 18.0% | 21.0% | 19.3% |
| LCN | % | 43.0% | 37.0% | 23.6% | 8.8% |
| HCN | % | 10.0% | 13.0% | 15.3% | 18.0% |
| LCO | % | 6.0% | 12.0% | 27.4% | 34.7% |
| HCO | % | 7.0% | 9.0% | 2.3% | 7.3% |
| Slurry | % | 4.0% | 3.5% | 3.0% | 2.9% |
| Coke | % | 5.0% | 5.0% | 5.0% | 6.0% |
| Standard conversion | % | 81% | 77% | 68% | 62% |
| Product properties | | | | | |
| HCN cetane | ASTM D4737 | 21.6 | 22.6 | 23.8 | 26.3 |
| LCO cetane | ASTM D4737 | 16.3 | 22.7 | 29.5 | 36 |
| HCO cetane | ASTM D4737 | 14.7 | 19.5 | 17.4 | 27.7 |
| Slurry density at 15° C. | kg/l | 1.096 | 1.047 | 1.022 | 0.984 |

It may be clearly observed from Tables I and II that, thanks to the lowering of the feedstock conversion level combined with the modification of the cutting points in primary fractionation and of the recycling of the undesired cuts to the reaction zone, it is possible to maximize the production of distillate and minimize that of slurry and gasoline, while preserving equivalent or even improved product qualities in terms of density and cetane number in comparison with the base case.

EXAMPLE 2

This example, based on the results obtained on the pilot unit, shows the various sets of yields which can be obtained for a feedstock consisting exclusively of atmospheric residue, as a function of the operating conditions and of the use of catalyst recycling from the separator and the recycling of unconverted fractions.

The catalyst is a conventional catalyst dedicated to the production of gasoline from heavy atmospheric residue type feedstock (the ratio of microporous specific surface to mesoporous specific surface is equal to 1, total surface area=110 m$^2$/g, Ni=3000 ppm weight and V=5000 ppm weight). The feedstock is an atmospheric residue having a boiling point between 330 and 730° C. with a density of 928.9 kg/m$^3$ and a Conradson carbon of 3.9% by weight.

In this example, case 1 corresponds to a gasoline operating mode favoring the production of light and heavy gasoline and of liquefied gases (LPGs). This is the reference case of this comparison.

Case 2 describes an operation in distillate mode taking account of the variation in operating conditions, in comparison with case 1. This represents the means for increasing the distillate yield without any change to the unit, here the main parameter is the lowering of the reaction temperature (TRX) by 23° C. The drop in standard conversion, defined as 100−(yields of LCO+slurry), is 10 percentage points. It is only 3 points for liquid conversion (LPG+light gasoline+heavy gasoline+LCO=sum of usable products). This also results in an increase of 5 percentage points in distillate, the sum of LCO+heavy gasoline, mainly to the detriment of light gasoline. The other result is the increase in slurry that is only utilizable to a small extent (+5.5 percentage points).

Case 3 corresponds to case 2 for which part of the catalyst from the separator, which catalyst is considered as a low activity catalyst due to a high CRC, has been recycled to the reactor to reduce the total activity of the catalyst contacted with the feedstock. By recycling about 30% by weight, the average delta coke of the catalyst mixture is 0.35% by weight. This serves to reduce the standard conversion by 12 percentage points in this case (8 for liquid conversion). The gain of 2.6 percentage points in distillate remains significant although smaller than for changing from case 1 to case 2. On the other hand, the penalty on the slurry becomes very high (+10 points).

Case 4 resumes case 3, for which a second reactor has been added in order to treat the excess slurry, here 83% of the slurry produced in case 3, prioritizing the recycling of the entire light fraction of the slurry (350-460° C.), and part of the heavy fraction. The conditions of the second riser are set to favor the conversion of this recycle, here C/O of 10 with a completely regenerated catalyst and a reaction temperature of 565° C. The consequence of the recycling is a decrease in the slurry yield (−12.8 percentage points versus case 3 and even −2.9 percentage points versus case 2) for a final distillate yield of 43.8 percentage points, or an improvement over cases 1 and 2 of 14.4 and 9.4 percentage points respectively. Moreover, this serves to preserve the liquid conversion in comparison with gasoline mode.

The combination of the catalyst and slurry recycles, combined with a drop in the severity of the operating conditions, makes it possible, with unchanged cut points, to adjust the selectivity of the FCC unit between maximum gasoline mode and maximum distillate mode.

TABLE III

|  | Case 1 | Case 2 | Case 3 | Case 4 |
|---|---|---|---|---|
| Mode | Gasoline | Distillate | Distillate | Distillate |
| TRX | 518 | 495 | 490 | 490 |
| C/O main reactor | 7 | 5 | 6 | 6 |
| catalyst recycle from separator (%) | — | — | Yes | Yes |
| 2$^{nd}$ reactor recycle | — | — | — | Yes (83% of case 3 slurry) |

TABLE III-continued

|  | Case 1 | Case 2 | Case 3 | Case 4 |
|---|---|---|---|---|
| Yield structure based on main feedstock (wt %) | | | | |
| Standard conversion | 76 | 66 | 54 | 61 |
| Liquid conversion | 79 | 76 | 68 | 79 |
| Distillate (150-360° C.) | 29.4 | 34.4 | 37.0 | 43.8 |
| Dry gases | 4.2 | 3.2 | 2.5 | 2.8 |
| LPG | 15.4 | 11.3 | 6.6 | 8.2 |
| Light gasoline (15-150° C.) | 34.4 | 29.8 | 24.0 | 26.9 |
| Heavy gasoline (150-220° C.) | 12.6 | 13.5 | 13.5 | 14.9 |
| LCO (220-350° C.) | 16.8 | 20.9 | 23.5 | 28.9 |
| Slurry (350+° C.) | 7.6 | 13.1 | 23.0 | 10.2 |
| Coke | 9 | 8.2 | 6.9 | 8.0 |

EXAMPLE 3

This example demonstrates the advantage of the invention in using conventional cracking catalysts, which favor the production of gasoline because of a high microporous, even zeolitic, specific surface, characterized by a ratio of microporous specific surface to mesoporous specific surface that is typically above 2, compared to a completely amorphous catalyst, only having a mesoporous specific surface and devoid of microporous specific surface, commercially known as BCA (Bottom Cracking Additive), which favors the production of LCO to the detriment of the slurry under the same cracking conditions as claimed for the invention.

The operating conditions (TRX or temperature and C/O) are given in Table IV below. Three tests were performed with a zeolitic catalyst like the one described in preceding example 2, and another two with a BCA catalyst known to prioritize the formation of LCO type distillate.

E1 corresponds to operation of the unit in gasoline mode on zeolitic catalyst.

D1 corresponds to operation of the unit in distillate mode on zeolitic catalyst without recycle, and only with a lowering of the cracking temperature.

D2 corresponds to operation of the unit in distillate mode on zeolitic catalyst with slurry recycle upstream of the feedstock injector according to the invention, resulting in partial coking of the catalyst before injection of the fresh feedstock.

D'1 corresponds to operation of the unit in distillate mode on a BCA system catalyst without recycle, and D'2 corresponds to operation of the unit in distillate mode on a BCA system catalyst with identical recycle to case D2 above.

| Catalyst | Zeolitic | | | Amorphous | |
|---|---|---|---|---|---|
| Mode | E1 | D1 | D2 | D'1 | D'2 |
| TRX | 518° C. | 505° C. | 505° C. | 505° C. | 505° C. |
| Recycle upstream of feedstock injector | no | no | yes | no | yes |
| Recycle rate (360+° C.) as percent of fresh feedstock flow rate | | | 5% | | 5% |
| Dry gases | 2.2 | 2.0 | 2.3 | 2.0 | 2.1 |
| LPG | 24.0 | 21.3 | 22.1 | 12.1 | 10.5 |
| Light gasoline (C5-160° C.) | 44.0 | 41.4 | 42.5 | 23.7 | 27.4 |
| Heavy gasoline (160-220° C.) | 8.0 | 10.6 | 11.3 | 9.6 | 9.8 |
| LCO (221-360° C.) | 12.7 | 14.1 | 14.9 | 21.3 | 21.7 |
| Slurry (360+° C.) | 5.2 | 6.2 | 2.4 | 27.3 | 24.7 |
| Coke | 3.9 | 4.4 | 4.5 | 4.0 | 3.8 |

-continued

| Catalyst | Zeolitic | | | Amorphous | |
|---|---|---|---|---|---|
| Conversion −221 | 82.1 | 79.7 | 82.7 | 51.4 | 53.7 |
| Liquid conversion | 88.7 | 87.4 | 90.8 | 66.7 | 69.4 |
| C/O (fresh feedstock) | 5.5 | 5.5 | 5.5 | 5.5 | 5.5 |
| HCN + LCO (distillate) | 20.7 | 24.7 | 26.2 | 30.9 | 31.5 |

In the presence of zeolitic catalyst, lowering the cracking temperature in the reactor gives rise to an increase in desired distillate but to the detriment of liquid conversion, because of a sharp increase in the quantity of unusable slurry. The addition of a slurry recycle to the reactor not only serves to even further increase the quantity of distillate produced, but also to mechanically increase the liquid conversion by destruction of the slurry thus recycled. On amorphous BCA catalyst, with or without recycle according to the invention, the quantity of slurry formed is more than ten times greater than that formed in the case of a zeolitic catalyst with recycle. Furthermore, the liquid conversion rate is much lower than that of the inventive method.

The invention claimed is:

1. A method for catalytic cracking to maximize the production of diesel base stocks, comprising a first cracking reaction step in an upflow fluidized bed reactor, a step of separating the cracked hydrocarbons and coked catalyst, a step of fractionating the cracked hydrocarbons and a step of regenerating said coked catalyst, wherein the hydrocarbon feedstock is injected into the upflow reactor on a catalyst partially deactivated by prior coking of at least part thereof in the same upflow reactor, so that a reaction temperature of the effluents leaving said reactor varies from 470 to 600° C., this prior coking being carried out by injecting at least one hydrocarbon compound having a boiling point equal to or higher than 350° C., on at least part of the regenerated catalyst bounded by at least one zone defined by means of an internal device, the hydrocarbon feedstock to treat being injected downstream from the internal device in said reactor, and a second cracking reaction step in an upflow reactor, operating in parallel to the first cracking step, and in which hydrocarbon cuts having a boiling point equal to or lower than 160° C., and hydrocarbon cuts having a boiling point equal to or higher than 330° C. are recycled on the regenerated catalyst.

2. The method as claimed in claim 1, wherein part of the coked catalyst, separated and then stripped during the separation step, is returned directly to the upflow reactor upstream, at and/or downstream of the hydrocarbon feedstock injection point, at a temperature equal to or lower than the reaction temperature.

3. The method as claimed in claim 2, wherein 1 to 100% of at least one hydrocarbon compound having a boiling point equal to or higher than 350° C., produced at the outlet of the fractionation step, is recycled on 1 to 100% by weight of the regenerated catalyst introduced at the bottom of the upflow reactor.

4. The method as claimed in claim 1, wherein part of the regenerated catalyst is coked upstream of the feedstock injection point by at least one hydrocarbon compound having a boiling point equal to or higher than 350° C. and wherein part of the coked and stripped catalyst, recovered in the separator, is also sent upstream, at and/or downstream of the feedstock injection point in the reactor.

5. The method as claimed in claim 1, wherein 1 to 75% by weight of the coked and stripped catalyst recovered in the separation step is recycled to the upflow reactor upstream, at and/or downstream of the feedstock injection point.

6. The method as claimed in claim 1, wherein at least one cut having a boiling point lower than 160° C. is injected on the regenerated catalyst in the upflow reactor upstream of the feedstock injection point.

7. The method as claimed in claim 1, wherein hydrocarbon cuts having a boiling point equal to or lower than 145° C., and hydrocarbon cuts having a boiling point equal to or higher than 350° C., are recycled on the regenerated catalyst in the second cracking step.

8. The method as claimed in claim 7, wherein the hydrocarbon cuts are selected from the effluents produced by the fractionation step, and from crude oil conversion and/or distillation units, including cuts derived from biomass.

9. The method as claimed in claim 7, wherein operations in this second upflow reactor are carried out in severe cracking conditions with a C/O ranging from 4 to 20 for reaction temperatures between 470 and 650° C.

* * * * *